No. 760,185. Patented May 17, 1904.

UNITED STATES PATENT OFFICE.

CARLETON ELLIS, OF BOSTON, MASSACHUSETTS, ASSIGNOR TO GEORGE M. PORT, OF BOSTON, MASSACHUSETTS.

COMPOSITION OF MATTER.

SPECIFICATION forming part of Letters Patent No. 760,185, dated May 17, 1904.

Application filed November 8, 1901. Serial No. 81,567. (No specimens.)

*To all whom it may concern:*

Be it known that I, CARLETON ELLIS, of Boston, in the county of Suffolk and State of Massachusetts, have invented a certain new and useful Composition of Matter, of which the following is a specification.

This invention relates to liquid compositions intended for the preservation of leather or fabrics exposed to wear and moisture, and more particularly to sole-savers for boots and shoes.

I shall now proceed to describe a preferred embodiment of my invention, together with certain modifications thereof; but it will be understood that various other embodiments, modifications, or equivalents would naturally come within the scope of the invention.

My preferred embodiment consists, essentially, of the compound or substance zinco-aluminium palmitate dissolved in a siccative oil, such as linseed-oil or Chinese wood-oil. As a filler to give the requisite consistency I add gilsonite (uintahite) or similar mineral resin, or, if desired, I may substitute for a part of the gilsonite a small amount of a hard fossil resin, such as gum-kauri or gum-anime. The composition is thinned with a suitable volatile oil, such as rosin spirits, (a light distillate obtained from the destructive distillation of common rosin,) turpentine, or benzene or its homologues.

The compound zinco-aluminium palmitate is or may be prepared as follows: Alkali palmitate or a soluble palmitic soap is dissolved in water at 60° centigrade, and to this is added an excess of a solution of zinc-aluminium sulfate (zinc alum)—that is to say, there is added more than a sufficient quantity of zinc and aluminium salts to the alkaline palmitate to combine and precipitate from solution all palmitic acid. An excess of from five to ten per cent. is usually desirable in order to induce thorough precipitation. The resulting precipitate of zinco-aluminium palmitate is washed and dried at 80° centigrade.

I do not restrict myself to any one proportion of zinc and alum contained in the compound zinco-aluminium palmitate, as by varying the proportions of these two metals slightly different properties result in the sole-saving composition. Increasing the amount of zinc gives hardness; decreasing it gives flexibility. Neither do I restrict myself solely to the use of the double compound zinco-aluminium palmitate. Both the zinc and the aluminium palmitate separately possess the property of giving great endurance to leather, and either may be used alone, if desired; but the best results are obtained when the zinco-aluminium palmitate, as above described, is used.

To prepare the single-metal palmitates, the above-described method of preparing the double-metal palmitates is followed, that of precipitation of palmitic acid from alkaline solution by a soluble metallic salt. To prepare zinc palmitate, for instance, precipitate with, say, zinc sulfate or acetate. In the same manner aluminium palmitate may be made by using aluminium sulfate or common potash alum.

If different proportions of the metals are desired in the compound zinco-aluminium palmitate from those obtained by zinc-alum precipitation, then it is necessary to take a salt of aluminium and a salt of zinc and dissolve in water in the proportions desired. This solution is used as the precipitating agent.

To prepare the sole-saving composition, proceed as follows: Five pounds zinco-aluminium palmitate and four pounds gilsonite are melted at as low a temperature as possible, and ten pounds of a hot mixture of equal parts linseed and Chinese wood oils are added. The heating is continued for about two hours, and then three gallons turpentine or other thinner are added. The mixture is allowed to cool and settle before using.

I claim—

1. The herein-described composition of matter comprising a metallic palmitate in solution in oil.

2. The herein-described composition of matter comprising aluminium palmitate in solution in oil.

3. The herein-described composition of matter comprising zinco-aluminium palmitate in solution in oil.

4. The herein-described composition of matter comprising a metallic palmitate, a siccative oil, and a resinous filler.

5. The herein-described composition of matter comprising zinc-aluminium palmitate, a siccative oil, a resinous filler, and a thinner.

6. The herein-described composition of matter comprising zinco-aluminium palmitate, linseed-oil, Chinese wood-oil, gilsonite, and turpentine.

In testimony whereof I have affixed my signature in presence of two witnesses.

CARLETON ELLIS.

Witnesses:
GEO. M. PORT,
R. M. PIERSON.